UNITED STATES PATENT OFFICE.

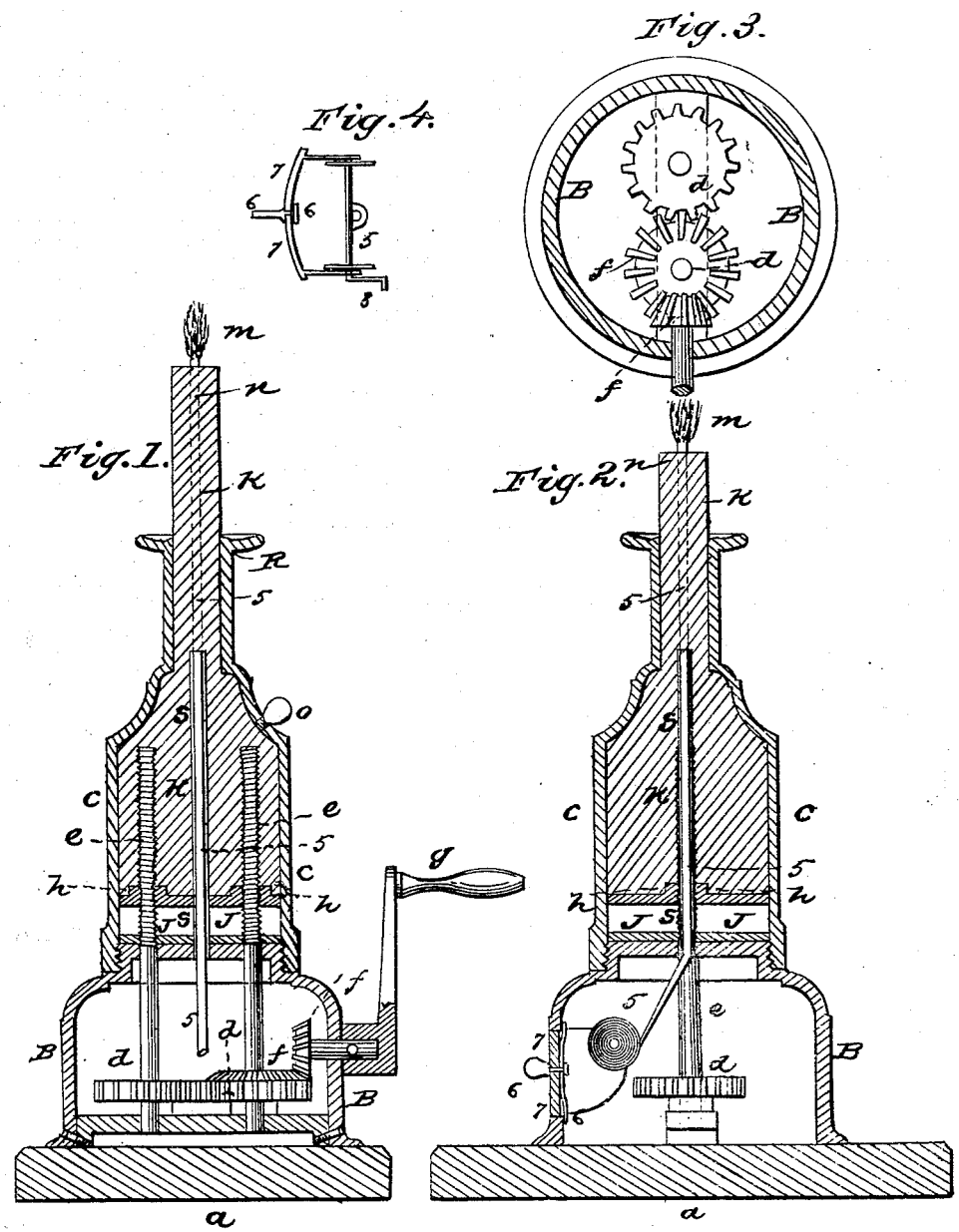
S. T. BARNES.
Candlestick.
No. 9,852.
Patented July 19, 1853.

SAMUEL T. BARNES, OF COLUMBUS, OHIO.

PRESS-MOLD CANDLESTICK.

Specification of Letters Patent No. 9,852, dated July 19, 1853.

*To all whom it may concern:*

Be it known that I, SAMUEL T. BARNES, of Columbus, Franklin county, Ohio, have invented a new and useful Improvement in what I denominate "Press-Mold Candle-Stands;" and I do hereby declare that the following is a full and exact description thereof, reference being had to the accompanying drawings and to the letters and figures of reference marked thereon.

Similar letters and figures refer to corresponding parts.

Figure 1, is a sectional elevation, showing the front view of the machinery on the inside, Fig. 2, is a sectional elevation showing the edge view of the machinery on the inside, Fig. 3, represents the plan of the gearing placed at the lower part of the stand, for working the screws, Fig. 4, represents the spool employed to furnish the candle with wick.

The nature of my invention consists in furnishing the press mold candle stand with a tube in the center of the mold through and out of which the candle is forced by pressure so as to supply it with a wick through the said tube—the wick being drawn from a spool attached to the lower part of the press provided for the purpose. The tube in the mold is made stationary and not allowed to extend up quite as high as the top of the mold and the wick is drawn up and brought out of the top of the tube so as the tallow when forced out will draw the wick off of the spool and up the tube and thereby provide the candle with a wick as it is pressed out of the mold.

(a a) is the platform or stand on which the cylindrical portions of the press (B B) and (C C) is screwed (B B) is the portion which serves as the framework for the wheels (d, d,) and F, F, and the screws (e, e,) which works the piston (h, h) and by which the tallow (k, k) is forced out of the tube at (R) as the tallow is pressed out it unwinds the wick (5, 5) off of the spool placed on the frame (7 7) in the side of the cylinder (B B) the wick passes up through a tube (S S) placed in the center of the cylinder the frame that contains the spool is held to its place by means of a catch (6, 6,) as is represented in Fig. 2, and the end view of which is represented in Fig. 4, also.

(5) represents the spool alluded to in the last mentioned figure as representing a crank by which the wick is wound up on the spool.

(O) represents the opening furnished with a screw plug through which the tallow is poured in a melted state and allowed then to get cold before pressing for a candle.

(J, J) is a piece of india rubber or leather placed at the bottom of the cylinder (C, C) in order to prevent the tallow from running out when poured in the cylinder in a melted state.

(m) represents the flame at the top of the candle (n).

Fig. 3, shows the plan of the wheels (d, d,) and f f placed in the lower part of the press (B B) and worked by the crank (g) represented in Fig. 1. The screws employed in this case to force the piston (p p) up are made right and left handed as the drawing represents, so as the piston will be forced on both sides in the same direction by turning the screws in different directions.

This press can be so constructed in size as to hold a sufficient amount of tallow to press a candle of most any length one of a size that will hold a sufficient to make a candle from forty to fifty inches long is the most desirable.

What I claim as my invention and desire to secure by Letters Patent is—

The wick tube S, S, to guide and retain the wick in the center of the candle in combination with the wick so arranged on a spool as to supply a continuous wick as the tallow is forced out to form the candle substantially in the manner described.

SAMUEL T. BARNES.

Witnesses:
J. H. GETZENDANNER,
MARTIN BENSON.